Dec. 2, 1924.

A. B. WALLEM

VALVE

Filed June 27, 1922

1,517,877

WITNESS:
Walter Chism

INVENTOR
Axel B. Wallem
BY
Francis C. [Chambers]
ATTORNEY

Patented Dec. 2, 1924.

1,517,877

UNITED STATES PATENT OFFICE.

AXEL B. WALLEM, OF CYNWYD, PENNSYLVANIA, ASSIGNOR TO H. S. B. W.-COCHRANE CORPORATION, OF PHILADELPHIA, PENNSYLVANIA, A CORPORATION OF PENNSYLVANIA.

VALVE.

Application filed June 27, 1922. Serial No. 571,243.

*To all whom it may concern:*

Be it known that I, AXEL B. WALLEM, a citizen of the United States of America, and resident of Cynwyd, in the county of Montgomery, State of Pennsylvania, have invented certain new and useful Improvements in Valves, of which the following is a true and exact description, reference being had to the accompanying drawings, which form a part thereof.

My invention relates to an improved valve construction especially well adapted for use as a balanced rotary regulating valve to be actuated through a valve stem extending through the side of the casing and it has for its object to provide a valve structure characterized by great simplicity and reliability in construction and operation, and a special feature of my invention is to provide for the closing of the port connecting the inlet and outlet chambers of the casing.

The nature of my invention and the features of novelty which characterize it will be best understood as described in connection with the drawings in which it is illustrated and in which—

Figure 1:
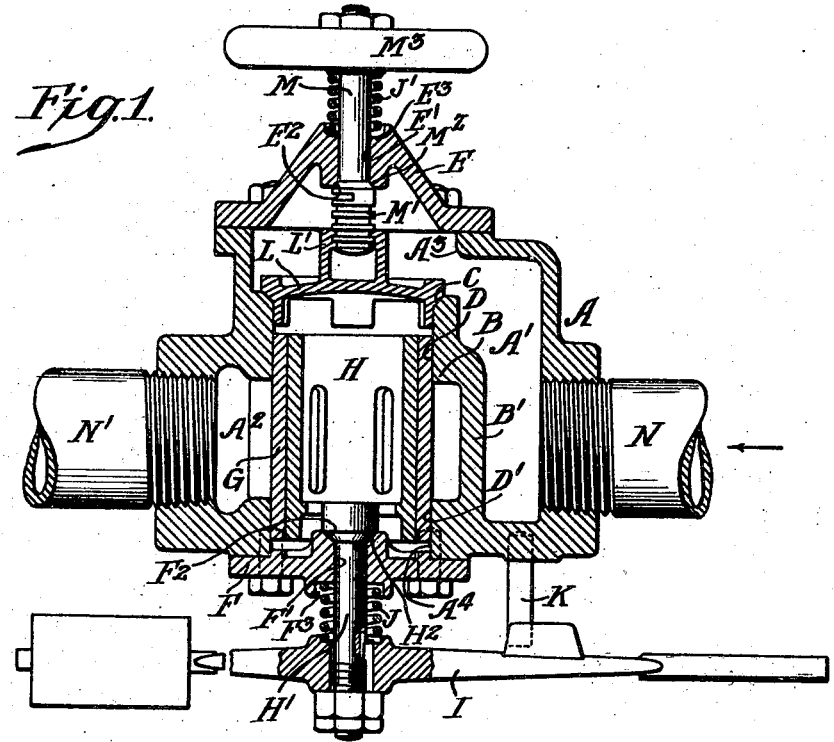
Figure 2:
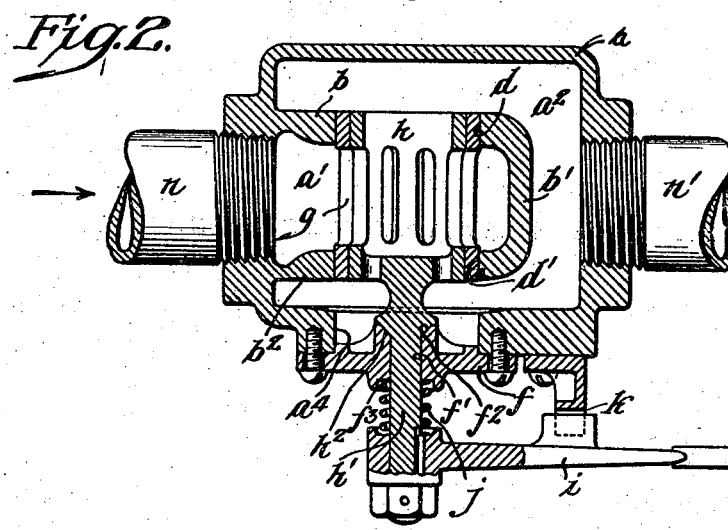

Figure 1 is a sectional plan view of a valve casing and valve embodying my invention, and Figure 2 is a similar sectional plan view of a modified construction also embodying some of my improvements.

Referring first to Fig. 1, A is a valve casing divided into inlet and outlet chambers A' and $A^2$ by a partition B, B', having a valve seated port C formed in it which connects the inlet and outlet chambers of the casing. $A^3$ is an opening formed through the wall of the casing on the inlet chamber side therein and opposite to the valve seated port C of the partition. $A^4$ is an opening formed through the opposite wall of the casing leading, as shown, to the outlet chamber side of the casing, this opening being for the purpose of permitting the insertion of the valve or valve and valve seat. D is a seat for a tubular valve seat formed in the partition wall B, and D' is also a seat for the tubular valve seat formed in the wall of the casing. E is a cover for the opening $A^3$ having, as shown, an opening E' formed through it for the passage of a valve actuating stem and a conical shoulder $E^2$ formed on the inside of this opening. $E^3$ is a spring seat formed on the outside of the cover. F is a cover for the opening $A^4$ in the ball of the casing, said cover being formed with an opening F' for the valve stem, a conical seat $F^2$ on the inside of this opening and a spring seat $F^3$ on the outside thereof. G is a tubular valve seat formed with slotted perforations and seated in the tubular surfaces D, D', as shown. The valve seat G is formed integrally with the cover plate F but it will be understood that this is not essential. H is a tubular slotted valve working in the valve seat G and having a valve stem H' which extends through the opening F' of the cover F and is formed with a shoulder $H^2$ which fits against the shoulder $F^2$ on the cover F. I is a valve actuating lever secured to the valve stem H' and J a spring which acts to draw the valve stem outward and keep the conical abutting faces $F^2$ and $H^2$ in contact. K is a stop for the valve actuating lever.

L is a valve provided for closing the port connecting the inlet and outlet chambers of the casing and adapted to be seated on the valve seat indicated at C. The valve L is provided with an internally threaded tubular extension indicated at L'. M is a valve actuating stem extending through the perforation E' in the cover E formed with a threaded portion M' screwing into the threaded tubular extension L' of the valve and with a conical shoulder $M^2$ which fits against the shoulder $E^2$ of the cover. $M^3$ is a hand wheel for rotating the valve stem M and J' a spring acting, as shown, to draw the valve stem M outward.

N and N' are respectively inlet and outlet pipes connecting with the chambers A' and $A^2$.

In assembling the different parts of the valve constructed as shown in Fig. 1, the valve seat G will be inserted in position in its seats D, D', and the valve H with its stem H' secured to it as shown, is inserted in its seat and the cover F slipped over the valve stem and secured in position as shown.

The valve L will also be inserted through the opening $A^3$, the cover E then being secured in the opening and the threaded portion M' engaged with the threaded sleeve of the valve L.

In normal operation the valve L is, of course, open leaving a free passage through the valve seated port C between the inlet chamber and the inside of the tubular valve. The liquid entering the chamber A' will pass to the inside of the tubular valve H and with the slots in this valve registered with the slots in the valve sleeve G the fluid will pass freely into the outlet chamber A². The pressure head of the fluid passing through the casing will always exert more force to press the valve H outward and keep its conical shoulder H² in contact with a conical shoulder F² of the cover F and this force acting on the valve can advantageously be supplemented by the action of the spring J; the force tending to draw the valve H outward will ordinarily be sufficient to maintain a sufficiently tight joint between the conical abutments and make the use of a stuffing box unnecessary or if any stuffing boxes should be found advisable one exerting but little frictional resistance to the movement of the valve can be employed.

The closure valve L is provided to cut off connection between the inlet and outlet chamber of the valve casing when desired as, for instance, when it may be desirable to remove the tubular valve or tubular valve seat.

Referring now to the modified construction shown in Fig. 2, $a$ indicates the valve casing which is separated into an inlet chamber $a'$ and outlet chamber $a^2$ by the partition indicated at $b$, $b'$, $b^2$. In this construction the opening $a^4$ is formed through the wall of the casing on the outlet side for the insertion of the tubular valve seat and tubular valve, and tubular seats $d$ and $d'$ are formed in the partition wall $b$ and $b^2$ for the tubular valve seat indicated at $g$ which is here shown as detached from the closure and secured in position independently thereof. $h$ is the tubular valve working in the valve seat $g$ and having extending from it the valve stem $h'$ with the conical shoulder $h^2$ formed upon it. $f$ indicates the cover for the opening $a^4$ formed with an opening $f'$ for the valve stem and the conical shoulder $f^2$ on the inside of this opening. $f^3$ indicates a spring seat on the outside of the cover; $i$, $i$, the actuating lever secured to the valve stem $h'$ and $j$ a spring acting to draw the valve stem upward as indicated.

In operation, fluid from the chamber $a'$ passes through the slotted ports in the tubular sleeve $g$ and tubular valve $h$ and through both ends of the tubular valve into the outlet chamber $a^2$, the pressure of the fluid together with the force exerted by the spring $j$ tending to hold the conical shoulders $h^2$ and $f^2$ in contact with each other, preventing the escape of fluid through the opening in the cover and making unnecessary the use of a stuffing box with the consequent frictional resistance to the movement of the valve.

Having now described my invention, what I claim as new and desire to secure by Letters Patent, is:

1. A valve casing having a partition separating it into inlet and outlet chambers, said partition being formed to provide seats for the ends of a cylindrical valve seat and an annular chamber surrounding the valve seat and forming a part of one of the valve chambers, in combination with a tubular cylindrical valve seat seated in said partition and having symmetrically disposed ports opening into the annular passage aforesaid and a tubular cylindrical valve rotatively fitting in the tubular valve seat and having symmetrically disposed ports.

2. A valve casing having a partition separating it into inlet and outlet chambers, said partition being formed to provide seats for the ends of a cylindrical valve seat and an annular chamber surrounding the valve seat and forming a part of one of the valve chambers, said partition having also an opening through which the chambers of the casing communicate and a seat for a closure valve surrounding said opening, in combination with a tubular cylindrical valve seat seated in said partition and having symmetrically disposed ports opening into the annular passage aforesaid, a tubular cylindrical valve rotatively fitting in the tubular valve seat and having symmetrically disposed ports and a closure valve operatable with the closure valve seat aforesaid.

AXEL B. WALLEM.